DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

Published March 16, 1971

884 O.G. 732

T884,008

ELECTRICAL CONDUCTOR HAVING AN INSULATION COVERING OF A POLYIMIDE FILM HAVING FLUOROCARBON RESIN COATINGS

Carl Gumerman, West Chester, Pa., assignor to E. I. du Pont de Nemours and Company, Wilmington, Del.

Filed Sept. 17, 1969, Ser. No. 858,878
**Int. Cl. B44d *1/14***
U.S. Cl. 117—218
No Drawing. 17 Pages Specification

An insulated electrical conductor is provided wherein the insulation covering is a polyimide film having a fluorocarbon polymeric coating of FEP or PTFE on at least one surface thereof, and wherein further the insulated conductor has an overcoating or external layer of a blend of between about 10% and about 35% by weight, based upon the total overcoating weight, of FEP fluorocarbon polymeric material and between about 65% and about 90% by weight, based upon the total overcoating weight, of PTFE fluorocarbon polymeric material; optionally, the overcoating may have up to about 35% by weight, based upon the total overcoating weight, of a pigment. The terms FEP and FEP fluorocarbon material both refer to copolymers of tetrafluoroethylene and hexafluoropropylene, and PTFE refers to homopolymers of tetrafluoroethylene. Representative pigments which can optionally be used in the overcoating include titanium dioxide, cadmium selenide red and lamp black.